United States Patent
Lu et al.

(10) Patent No.: US 8,911,821 B2
(45) Date of Patent: Dec. 16, 2014

(54) METHOD FOR FORMING NANOMETER SCALE DOT-SHAPED MATERIALS

(75) Inventors: Chun-An Lu, Xinzhuang (TW); Hong-Ching Lin, Kaohsiung (TW); Kuo-Chan Chiou, Tainan (TW); Szu-Po Huang, Taipei (TW)

(73) Assignee: Industrial Technology Research Institute (TW)

(*) Notice: Subject to any disclaimer, the term of this patent is extended or adjusted under 35 U.S.C. 154(b) by 0 days.

(21) Appl. No.: 12/563,419

(22) Filed: Sep. 21, 2009

(65) Prior Publication Data

US 2010/0270516 A1    Oct. 28, 2010

(30) Foreign Application Priority Data

Apr. 22, 2009  (TW) .............................. 98113282 A

(51) Int. Cl.
| | | |
|---|---|---|
| B05D 5/12 | (2006.01) | |
| B22F 9/30 | (2006.01) | |
| B22F 1/02 | (2006.01) | |
| C01G 1/02 | (2006.01) | |
| C09D 11/52 | (2014.01) | |

(52) U.S. Cl.
CPC . B22F 9/30 (2013.01); B22F 1/025 (2013.01); C01G 1/02 (2013.01); C09D 11/52 (2013.01); B22F 2998/00 (2013.01); C01P 2002/72 (2013.01); C01P 2006/40 (2013.01)
USPC ............. 427/126.1; 427/126.3; 427/226; 252/500; 252/502; 252/506; 252/519.2; 252/518.1

(58) Field of Classification Search
CPC .................................. H01B 1/22; H01B 1/02
USPC ............... 252/500, 512, 513, 514, 502, 506, 252/519.2, 518.1; 106/1.01, 1.14, 1.22, 106/1.23; 427/123, 126.1, 126.3, 226
See application file for complete search history.

(56) References Cited

U.S. PATENT DOCUMENTS

| | | | |
|---|---|---|---|
| 3,999,957 A | 12/1976 | Tongyai | |
| 4,888,135 A | 12/1989 | Tsunaga et al. | |
| 5,045,236 A | 9/1991 | Tsunaga et al. | |
| 5,089,063 A | 2/1992 | Harrah et al. | |
| 5,139,890 A | 8/1992 | Cowie et al. | |
| 5,151,304 A | 9/1992 | Lee | |
| 5,178,909 A | 1/1993 | Hayashi | |
| 5,190,795 A | 3/1993 | Culler | |
| 5,882,722 A * | 3/1999 | Kydd ............................ 427/98.4 |
| 6,036,889 A * | 3/2000 | Kydd ............................ 252/512 |
| 6,599,446 B1 | 7/2003 | Todt et al. | |
| 6,824,603 B1 * | 11/2004 | Kydd ....................... 106/287.35 |
| 7,026,432 B2 | 4/2006 | Charati et al. | |
| 7,060,241 B2 | 6/2006 | Glatkowski | |
| 7,062,848 B2 | 6/2006 | Pan et al. | |
| 7,115,992 B2 | 10/2006 | Moore et al. | |
| 7,141,185 B2 | 11/2006 | Conaghan et al. | |
| 7,211,205 B2 | 5/2007 | Conaghan et al. | |
| 7,291,729 B2 | 11/2007 | Kertesz et al. | |
| 7,354,988 B2 | 4/2008 | Charati et al. | |
| 7,462,656 B2 | 12/2008 | Keulen et al. | |
| 8,431,222 B2 | 4/2013 | Paul | |
| 8,465,677 B2 | 6/2013 | Lu et al. | |
| 2002/0048677 A1 | 4/2002 | Hanneman, Jr. et al. | |
| 2003/0091789 A1 | 5/2003 | Koskenmaki et al. | |
| 2004/0005412 A1 | 1/2004 | Byun et al. | |
| 2004/0099374 A1 | 5/2004 | Kanakarajan | |
| 2004/0144958 A1 | 7/2004 | Conaghan et al. | |
| 2005/0064102 A1 | 3/2005 | Audenaert et al. | |
| 2005/0107497 A1 | 5/2005 | Akaho et al. | |
| 2006/0069199 A1 | 3/2006 | Charati et al. | |
| 2006/0257625 A1 | 11/2006 | Wakizaka | |
| 2007/0048514 A1 | 3/2007 | Rockford | |
| 2008/0003363 A1 | 1/2008 | Park et al. | |
| 2009/0032290 A1 | 2/2009 | Yeh et al. | |
| 2009/0087570 A1 | 4/2009 | Kawata et al. | |
| 2009/0104474 A1 | 4/2009 | Schwartz et al. | |

(Continued)

FOREIGN PATENT DOCUMENTS

| | | |
|---|---|---|
| CA | 2101938 A1 | 8/1992 |
| CN | 1471713 | 1/2004 |

(Continued)

OTHER PUBLICATIONS

K.S. Park et al., "Surface modification by silver coating for improving electrochemical properties of LiFePO4," Science Direct, Solid State Communications 129 (2004) 311-314.

Liyue Liu et al.., "Multi-wall carbon nanotube as a new infrared detected material", Elsevier, Sensors and Actuators A 116 (2004) 394-397.

H.R. Astorga et al., "Electrical conductivity of multiwall carbon nanotubes thin films", Elsevier, Optical Materials 27 (2005) 1228-1230.

E.L.O. Bakes et al., "The photoelectric heating mechanism for very small graphitic grains and polycyclic aromatic hydrocarbons", The Astrophyical Journal, Part 1, p. 822-838, vol. 427, No. 2.

(Continued)

*Primary Examiner* — Mark Kopec
*Assistant Examiner* — Haidung Nguyen
(74) *Attorney, Agent, or Firm* — Lowe Hauptman & Ham, LLP

(57) ABSTRACT

A method for forming nanometer scale dot-shaped materials is provided. The method includes providing a sub-micrometer scale material and a metallo-organic compound. The sub-micrometer scale material and the metallo-organic compound are mixed in a solvent. Then, the metallo-organic compound is decomposed by thermal decomposition process and reduced to form a plurality of nanometer scale dot-shaped materials on the sub-micrometer scale material, wherein the sub-micrometer scale material and the nanometer-scale dot-shaped materials are heterologous materials. Then, the plurality of nanometer scale dot-shaped materials is melted, such that a plurality of the adjacent sub-micrometer scale materials is connected to each other to form a continuous interface between the sub-micrometer scale materials.

13 Claims, 3 Drawing Sheets

(56) References Cited

U.S. PATENT DOCUMENTS

| | | |
|---|---|---|
| 2009/0236565 A1 | 9/2009 | Mercx et al. |
| 2009/0283308 A1 | 11/2009 | Tsukamoto |
| 2010/0200148 A1 | 8/2010 | Douglas |
| 2010/0270516 A1 | 10/2010 | Lu et al. |
| 2011/0101283 A1 | 5/2011 | Lu et al. |
| 2012/0168211 A1 | 7/2012 | Lu et al. |

FOREIGN PATENT DOCUMENTS

| | | |
|---|---|---|
| CN | 100372892 | 3/2008 |
| CN | 101522318 | 9/2009 |
| CN | 201657486 | 11/2010 |
| CN | 101908388 A | 12/2010 |
| CN | 102555323 A | 7/2012 |
| DE | 4322516 A1 | 1/1994 |
| GB | 1173584 A | 12/1969 |
| JP | 5076830 A | 3/1993 |
| JP | 2004279917 A | 10/2004 |
| JP | 2005-267900 A | 9/2005 |
| JP | 2005322449 A | 11/2005 |
| JP | 2007115875 A | 5/2007 |
| TW | 201038466 | 11/2010 |
| TW | I383950 B | 11/2010 |
| TW | 201117230 A | 5/2011 |
| TW | 201228502 A | 7/2012 |
| WO | 9213510 A1 | 8/1992 |
| WO | 2008/045109 A2 | 4/2008 |
| WO | WO 2009/040774 | 4/2009 |

OTHER PUBLICATIONS

N.R. Bieri, J. Chung et al., "Microstructuring by printing and laser curing of nanoparticle solutions", Applied Physics Letters, 2003, 3529-3531, vol. 82, No. 20.

Office Action for U.S. Appl. No. 12/813,749, Aug. 24, 2012.

Office Action dated Jan. 6, 2014 from corresponding application No. CN 201010616446.9.

Office Action dated Sep. 10, 2013 from corresponding application No. TW099146826.

Office Action dated Nov. 15, 2013 from corresponding U.S. Appl. No. 13/221,414.

Office Action dated Oct. 2, 2014 from corresponding U.S. Appl. No. 13/221,414.

\* cited by examiner

METHOD FOR FORMING NANOMETER SCALE DOT-SHAPED MATERIALS

CROSS REFERENCE TO RELATED APPLICATIONS

This Application claims priority of Taiwan Patent Application No. 98113282, filed on Apr. 22, 2009, the entirety of which is incorporated by reference herein.

BACKGROUND OF THE INVENTION

1. Field of the Invention

The invention relates to nanometer scale material, and more particularly to a method for forming nanometer scale dot-shaped material.

2. Description of the Related Art

Flexible electronic technology offers product design flexibility, light weight, low cost products and quick fabrication processes. The substrates and materials used for the flexible electronic technology need to be flexible. Accordingly, flexible electronic materials need to be selected from materials that can be printed and fabricated at low temperatures.

Generally, conventional materials used for printing are conductive metal ink, which is a conductive coating formed by high temperature sintering. Conventional conductive metal ink is usually used for rigid ceramic substrates. The conventional conductive metal ink comprises an organic polymer, conductive metal particles glass and other additions, such as a dispersion agent or a rheology agent. After a degreasing process at a high temperature of 250-450° C. and a co-sintering process at a temperature of 850-1100° C., the organic polymer is removed and the conductive metal particles are transformed into a metal crystal having a continuous phase. The adhesion strength of the conventional conductive coating is provided by the glass softening. However, the conventional metal ink is only applicable for rigid substrates formed by high temperatures.

Generally, conventional flexible electronic materials are low temperature cured epoxy resin type conductive paste, which is made from polymer, used as a major material, having sheet-shaped metal conductive particles therein. Although the conventional conductive epoxy resin can be formed at a temperature lower than 200° C., the conductivity thereof is poor and the conventional conductive epoxy resin can not be soldered. Additionally, the adhesion strength and the conductivity of the conventional conductive epoxy resin, respectfully, decreases due to subsequent processes.

Currently, the method used to enhance the conductivity of a conductive metal ink, is to coat another metal on sub-micrometer scale particles. U.S. Pat. No. 5,139,890 discloses coating a thick silver film on a surface of copper or copper alloy particles and then coating a thin gold film on the silver film. The silver film needs to have a thickness of at least 3.5 μm, and the gold film on the silver film needs to have a thickness smaller than 0.5 μm. The silver film and the gold film both are formed by an electroplating, an electrolytic deposition, an electroless plating or a vacuum vapor deposition process.

Japan Patent No. 2005-267900 discloses a low temperature conductive ink technology. Specifically, a mixture utilizing silver powders mixed with nanometer scale silver oxide is formed and dispersed in an ink. Then, an organic compound with reducing ability is added in the ink to form a high conductive ink which can be cured by a low temperature sintering process. The silver oxide has an average diameter of 5 nm-15 μm. The silver oxide is formed by salting of the silver nitrate, adding a polymer dispersant and a surfactant thereto, dissolving the resulting mixture in water, and adding a water-based oxidant to form a silver oxide precipitate. The silver particles used in the ink have a diameter of about 20 nm-15 μm. The shape of the silver particle may be sphere shaped or a sheet. The ink can be used in a coating process such as a screen printing, a plate printing or a flexible plate printing coating process and can be sintered at a thermal treatment temperature of 200° C.

In addition, K. S. Park et al. disclosed in "surface modification by silver coating for improving electrochemical properties of $LiFePO_4$" in the Solid State Communications, Volume 129, Issue 5, February 2004, Pages 311-314, using silver ions, as a coating on a surface of a positive electrode of a lithium battery made of lithium-iron-phosphorus compound oxide. Specifically, a silver nitrate solution was coated on a surface of a positive electrode by an electrochemical and wetting mixed coating method, such that the capacitance of the lithium battery was enhanced to 140 mAh/g and an initial voltage thereof was reduced to 3.3V.

BRIEF SUMMARY OF THE INVENTION

The invention provides a method for forming a nanometer scale dot-shaped material. The method comprises providing a sub-micrometer scale material and a metallo-organic compound, and mixing the sub-micrometer scale material with the metallo-organic compound in a solvent. The metallo-organic compound is thermal decomposed and reduced to form a plurality of nanometer scale dot-shaped materials on the sub-micrometer scale material, wherein the plurality of nanometer scale dot-shaped materials and the sub-micrometer scale material are heterologous. Then, the plurality of nanometer scale dot-shaped materials is melted to connect a plurality of the adjacent sub-micrometer scale materials to form a continuous interface between the sub-micrometer scale materials.

A detailed description is given in the following embodiments with reference to the accompanying drawings.

BRIEF DESCRIPTION OF THE DRAWINGS

The invention can be more fully understood by reading the subsequent detailed description and Examples with reference to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

The invention utilizes a low temperature metallo-organic decomposition (MOD) of a metallo-organic compound to form a nanometer scale dot-shaped material that adheres to a surface of another heterologous material. The bonding between an organic group end and a metal of the metallo-organic compound is a weak bond between hetero-atoms, such that the organic group end can be removed by thermal decomposition at a temperature lower than 300° C. and the metallo-organic compound can be reduced to form nanometer scale dot-shaped materials.

Figure 1:
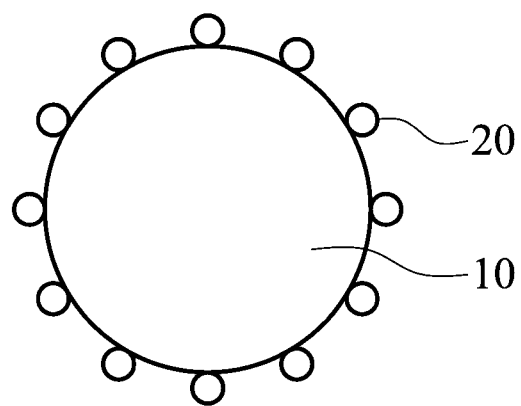
FIG. 1 shows a schematic cross section of a plurality of nanometer scale dot-shaped materials dispersed on a surface of a sub-micrometer scale material powder according to an embodiment of the invention.

The invention utilizes a polar or a non-polar solvent to dissolve the metallo-organic compound to form a solution and then the solution is mixed with a sub-micrometer scale material powder. The metallo-organic compound can be uniformly dispersed on surfaces of the sub-micrometer scale material powder by the solution. Then, the nanometer scale dot-shaped materials can be formed on the surfaces of the sub-micrometer scale material powder by low temperature metallo-organic decomposition and reduction of the metallo-organic compound, wherein the nanometer scale dot-shaped materials are in-situ dispersed on the surfaces of the sub-micrometer scale material powder. Referring to FIG. 1, a schematic cross section of a plurality of nanometer scale dot-shaped materials 20 dispersed on a surface of a sub-micrometer scale material powder 10 according to an embodiment of the invention is shown.

In an embodiment of the invention, first, a dispersant such as one of the pyridine tri-nitrogen-hexa-cyclic derivatives is utilized to disperse the sub-micrometer scale material powder in the polar or non-polar solvent, for example xylene or toluene. The sub-micrometer scale material may be powder formed from metal, oxide, nanometer scale carbon tube, nanometer scale metal tube or nanometer scale oxide tube, which has a diameter smaller than 1 μm. The metal is for example copper, nickel, aluminum, silver or gold. The oxide is for example zinc oxide, aluminum oxide, magnesium oxide, beryllium oxide, zirconium oxide, transition metal oxide or a multi-metal system oxide containing more than one metal. The nanometer scale carbon tube is for example a single-walled or a multi-walled nanometer scale carbon tube. The nanometer scale oxide tube may be a nanometer scale tube formed from zinc oxide, aluminum oxide, magnesium oxide, beryllium oxide, zirconium oxide, transition metal oxide or a multi-metal system oxide. The nanometer scale metal tube may be a nanometer scale tube formed from silver, gold, copper, zinc or aluminum.

Then, the metallo-organic compound is dissolved in the same polar or non-polar solvent used for the sub-micrometer scale material powder and mixed with the sub-micrometer scale material. The metallo-organic compound and the sub-micrometer scale material are heterologous materials. In an embodiment of the invention, the metallo-organic compound can be represented by a formula of $(RCOO)_y M^{(y)}$, which has a molecular structure as below:

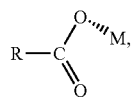

wherein R is a straight-chain or a branched-chain $C_n H_{2n+1}$, n is an integral of 5-20, M is a metal, the metal may be copper, silver, gold, aluminum, titanium, zinc, nickel, tin, iron, indium, platinum or palladium, and y is a valence of the metal.

Next, thermal decomposition and reduction of the metallo-organic compound are performed at a temperature lower than 300° C. The metallo-organic compound is reduced to a nanometer scale dot-shaped material may comprise metal or metal oxide, which has a size smaller than 100 nm. A plurality of nanometer scale dot-shaped materials is non-continuously dispersed on surfaces of the sub-micrometer scale material. The nanometer scale dot-shaped materials can be melt bonded on or adhere to the surfaces of the sub-micrometer scale material. The nanometer scale dot-shaped material may comprise metal such as copper, silver, gold, aluminum, titanium, zinc, nickel, tin, iron, indium, platinum or palladium. The nanometer scale dot-shaped material may comprise metal oxide such as copper oxide, silver oxide, aluminum oxide, titanium oxide, nickel oxide, iron oxide, zinc oxide, tin oxide, indium tin oxide or silicon oxide.

Figure 2:
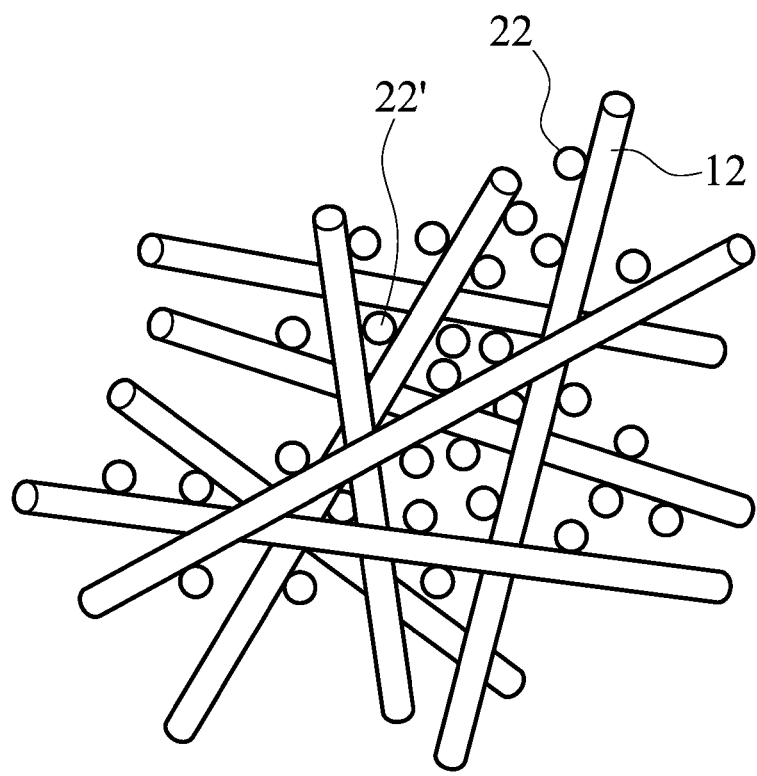
FIG. 2 shows a schematic view of a plurality of nanometer scale dot-shaped materials dispersed on surfaces of a plurality of nanometer scale tubes and between the nanometer scale tubes according to an embodiment of the invention.

In an embodiment of the invention, the sub-micrometer scale material can be a plurality of nanometer scale tubes interlacing each other. The nanometer scale tube may be a nanometer scale carbon tube, a nanometer scale metal tube or a nanometer scale oxide tube. The nanometer scale dot-shaped materials are non-continuously dispersed on the surfaces of the nanometer scale tubes and between the nanometer scale tubes. While a group of nanometer scale tubes has a size larger than 100 nm, the nanometer scale dot-shaped materials can be disposed in the interior of the group of nanometer scale tubes. Referring to FIG. 2, a schematic view of a plurality of nanometer scale dot-shaped materials 22 dispersed on surfaces of a plurality of nanometer scale tubes 12 and a plurality of nanometer scale dot-shaped materials 22' dispersed between the nanometer scale tubes 12 according to an embodiment of the invention are shown.

In an embodiment of the invention, the metallo-organic compound used in the method for forming the nanometer scale dot-shaped materials has a function of dispersal of the sub-micrometer scale material. In addition, thermal decomposition and reduction of the metallo-organic compound of the method for forming the nanometer scale dot-shaped materials is performed at a low temperature, which can satisfy requirements for flexible substrates.

Figure 3A:
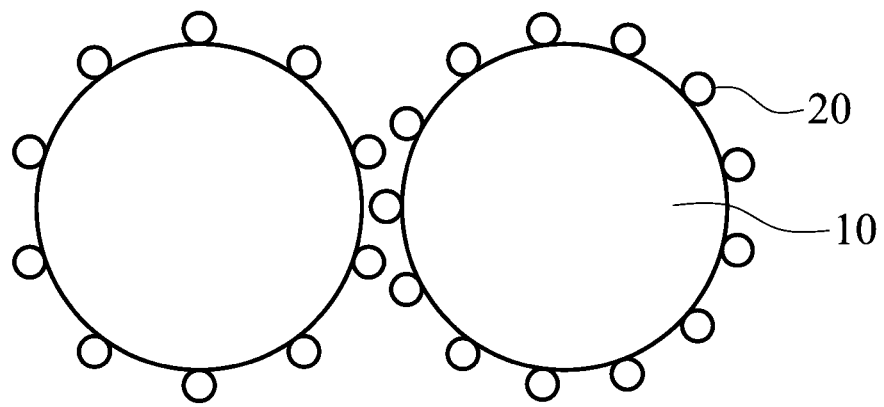
FIGS. 3A-3B show schematic views of two adjacent sub-micrometer scale metal materials connected by melting the nanometer scale dot-shaped materials according to an embodiment of the invention.
Figure 3B:
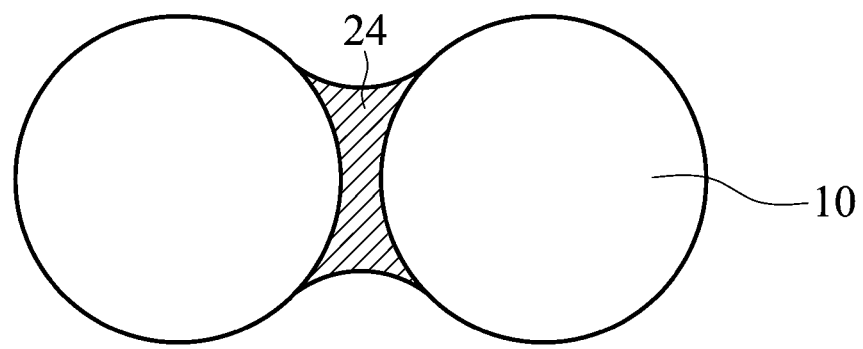

The nanometer scale dot-shaped material of the invention can be applied to a nanometer scale metal contact. The nanometer scale metal contact can be melted at a temperature lower than 200° C., such that the adjacent sub-micrometer scale metal materials can be connected by the melting nanometer scale dot-shaped materials to form a continuous interface between two phases of metal. The physical strength and the electrical conductivity of an ink having the nanometer scale dot-shaped materials can be enhanced. The nanometer scale metal contact having a low melting point can be used as a connection between sub-micrometer scale metal materials. Accordingly, the curing temperature of the conductive ink can be significantly reduced and the electrical conductivity of the ink and the density of a film formed from the ink can be enhanced. Referring to FIGS. 3A-3B, FIGS. 3A-3B show two adjacent sub-micrometer scale metal materials 10 connected by melting the nanometer scale dot-shaped materials 20 to form a continuous interface 24 between two phases of metal according to an embodiment of the invention.

Because the nanometer scale dot-shaped materials of the invention are formed and melted on the surfaces of the nanometer scale tubes or between the nanometer scale tubes for connecting the nanometer scale tubes with each other, a three-dimensional conductive structure of the nanometer scale tubes is improved and the electrical conductivity of the nanometer scale carbon tubes or the nanometer scale metal tubes is enhanced. In an embodiment of the invention, the nanometer scale dot-shaped materials can be used for an electrode of the nanometer scale oxide tube and applied to point discharge. Additionally, the nanometer scale dot-shaped materials of the invention also have other functions such as providing adsorption, de-adsorption or catalysis for gases or liquids.

Further, if the nanometer scale dot-shaped metal materials of the invention are formed on the surfaces of the sub-micrometer scale metal oxide materials, the nanometer scale dot-shaped metal materials can be used as an electrode layer of the dielectric metal oxide materials to form a nanometer scale series capacitor. In an embodiment of the invention, the nanometer scale dot-shaped metal materials can be adhered to a surface of a positive electrode of a lithium battery made of oxide materials, such that the capacitance of the lithium battery can be enhanced and the heat release of the lithium battery can be reduced. In addition, the nanometer scale dot-shaped metal materials of the invention also can be adhered to surfaces of sub-micrometer scale metal oxide materials which have semiconductor characteristics to form passive devices such as a positive temperature coefficient resistor, a negative temperature coefficient resistor or a pressure sensitive resistor.

The fabrication methods and applications of the nanometer scale dot-shaped metal materials of the invention are described in detail by several Examples and Comparative Examples as below:

Examples 1-4

Figure 4:
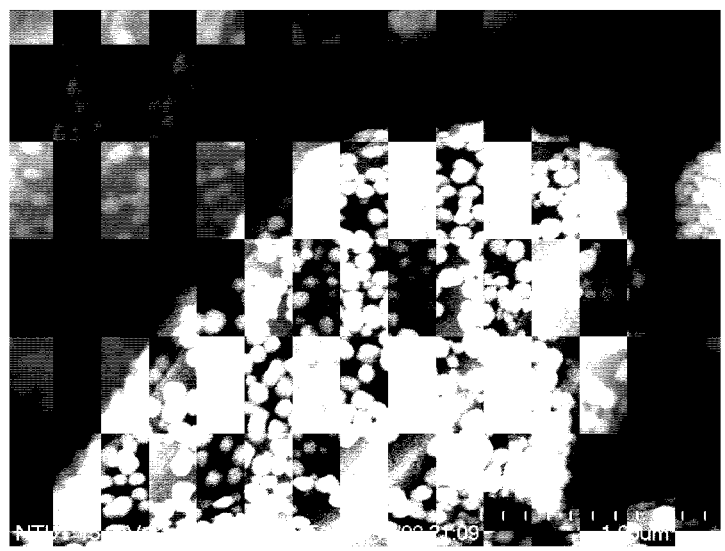
FIG. 4 shows a scanning electron microscope (SEM) photograph of a plurality of nanometer scale silver particles adhered to a sub-micrometer scale copper particle according to the Example 1 of the invention.

An organic acid silver ($C_5H_{11}COOAg$) compound was dissolved in a solvent of xylene and then uniformly mixed with copper metal particles with a diameter of 1 μm, having a dispersant of cetyl trimethyl ammonium bromide (CTAB) by 0.1-10 wt % therein, to form conductive inks of the Examples 1-4. The compositions of the inks of the Examples 1-4 were shown in Table 1. Then, thermal decomposition and reduction was performed to the organic acid silver ($C_5H_{11}COOAg$) compound at 150° C. to form a plurality of nanometer scale silver particles adhered to sub-micrometer scale copper particles. A photograph of the plurality of nanometer scale silver particles adhered to the sub-micrometer scale copper particles by a scanning electron microscope (SEM) is shown in FIG. 4, wherein the matrix is a copper particle with a diameter of 1 μm and nanometer scale silver particles reduced from the organic acid silver ($C_5H_{11}COOAg$) compound are disposed on the copper particle.

The solvent was removed at 150° C. and then the temperature was increased to 200° C. and 250° C., respectively, to perform a sintering process for curing the conductive inks. The sheet resistances of the cured conductive inks of the Examples 1-4 were measured and the results are shown in Table 1. The samples for sheet resistance measurement were fabricated by coating the conductive ink on a glass substrate, drying at 150° C. and sintering at 200-250° C.

Table 1 the compositions and the surface sheet resistances of the inks of Examples 1-4

| | ink composition | | sintering temperature | |
|---|---|---|---|---|
| | $C_5H_{11}COOAg$/ xylene = 30 wt %:70 wt % | sub-micrometer scale copper particle | 200° C. sheet resistance (Ω/□) | 250° C. |
| Example 1 | 80 wt % | 20 wt % | 0.59 | 0.31 |
| Example 2 | 70 wt % | 30 wt % | 1.32 | 0.72 |
| Example 3 | 50 wt % | 50 wt % | X | 1.31 |
| Example 4 | 30 wt % | 70 wt % | 1.49 | 0.48 |

Examples 5-16

An organic acid silver ($C_7H_{15}COOAg$) compound was dissolved in a solvent of xylene and then uniformly mixed with several nanometer scale carbon tubes having different structures with product models of CQ201NT (a tube diameter of 10-40 nm and a length of 5-15 μm), CF181C (a tube diameter of 10-40 nm and a length of 5-30 μm) and CF104N (a tube diameter of 10-40 nm and a length of 5-50 μm), respectively, to form conductive inks of the Examples 5-16. The compositions of the inks of the Examples 5-16 are shown in Table 2. Then, thermal decomposition and reduction was performed to the organic acid silver ($C_7H_{15}COOAg$) compound at 200° C. to form a plurality of nanometer scale silver particles adhered to nanometer scale carbon tubes. The inks of the Examples 5-16 were coated on a glass substrate by a spin coating or a blade coating process. The sheet resistances of the cured conductive inks of the Examples 5-16 were measured and the results are shown in Table 2.

Table 2 the compositions and the surface sheet resistances of the inks of Examples 5-16

| | $C_7H_{15}COOAg$/ xylene | nanometer scale carbon tube (wt %) | | sheet resistance (Ω/□) | |
|---|---|---|---|---|---|
| | | | | spin coating | blade coating |
| Example 5 | 30 wt %/70 wt % | CF181C | 0.5 | 3.89 | — |
| Example 6 | | | 5 | 13.84K | 8.6K |
| Example 7 | | CF104N | 0.5 | 0.15 | — |
| Example 8 | | | 5 | 43.24 | 18.87K |
| Example 9 | | CQ201NT | 0.5 | 0.20 | — |
| Example 10 | | | 5 | 202.8 | 22.2K |
| Example 11 | 20 wt %/80 wt % | CF181C | 1 | X | 28.9 |
| Example 12 | | CF104N | 1 | X | X |
| Example 13 | | CQ201NT | 1 | X | X |
| Example 14 | 10 wt %/90 wt % | CF181C | 5 | X | 52.6 |
| Example 15 | | CF104N | 5 | X | 28.4K |
| Example 16 | | CQ201NT | 5 | X | 45.1K |

X: non-conductive

Comparative Examples 1-3

The difference between the inks of Comparative Examples 1-3 and the inks of Examples 5-16 was the ratio of the ink composition. The inks of Comparative Examples 1-3 were without organic acid silver ($C_7H_{15}COOAg$) compound. The compositions and the sheet resistances of the inks of Comparative Examples 1-3 are shown in Table 3.

Table 3 the compositions and the surface sheet resistances of the inks of Comparative Examples 1-3

| | $C_7H_{15}COOAg/$ xylene | nanometer scale carbon tube (wt %) | | sheet resistance ($\Omega/\square$) spin coating | spin coating |
|---|---|---|---|---|---|
| Comparative Example 1 | 0 wt %/100 wt % | CF181C | 1 | X | X |
| Comparative Example 2 | | CF104N | 1 | X | X |
| Comparative Example 3 | | CQ201NT | 1 | X | X |

X: non-conductive

As shown in the results of Table 1, the content of the organic acid silver ($C_5H_{11}COOAg$) compound in the conductive ink is higher, such that the sheet resistance of the conductive ink is lower. Thus, organic acid silver ($C_5H_{11}COOAg$) compound can help to increase the conductivity of the inks. In addition, the higher sintering temperature can help to reduce the sheet resistance of the conductive ink. Thus, the ratio of copper particles connected by melting the nanometer scale silver particles is increased when the sintering temperature is increased.

Additionally, as shown in the results of Table 2 and Table 3, the addition of the organic acid silver ($C_5H_{11}COOAg$) compound can help to increase the conductivity of the inks.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for forming a continuous interface between a plurality of sub-micrometer scale materials, the method comprising:
   providing the plurality of sub-micrometer scale materials, wherein the sub-micrometer scale materials are powders having a diameter smaller than 1 μm, and the plurality of sub-micrometer scale materials comprises nanometer scale carbon tubes, nanometer scale metal tubes, or nanometer scale oxide tubes;
   providing a metallo-organic compound;
   using xylene or toluene to dissolve the metallo-organic compound to form a solution;
   mixing the solution with the plurality of sub-micrometer scale materials so that the metallo-organic compound is uniformly dispersed on surfaces of the plurality of sub-micrometer scale materials;
   performing thermal decomposition and reduction of the metallo-organic compound to form a plurality of nanometer scale dot-shaped materials in-situ dispersed on the surface of the plurality of sub-micrometer scale materials wherein the plurality of nanometer scale dot-shaped materials and the plurality of sub-micrometer scale materials are heterogeneous; and
   melting the plurality of nanometer scale dot-shaped materials to connect the plurality of the sub-micrometer scale materials to each other and to form the continuous interface between the plurality of sub-micrometer scale materials.

2. The method as claimed in claim 1, wherein the step of performing thermal decomposition and reduction of the metallo-organic compound is performed at a temperature lower than 300° C.

3. The method as claimed in claim 1, wherein the metallo-organic compound is represented by $(RCOO)_yM^{(y)}$, and wherein R is a straight-chain or a branched-chain $C_nH_{2n+1}$, n is an integer of 5-20, M is metal comprising copper, silver, gold, aluminum, titanium, zinc, nickel, tin, iron, indium, platinum or palladium, and y is a valence of the metal.

4. The method as claimed in claim 1, wherein the plurality of nanometer scale dot-shaped materials has a size smaller than 100 nm and the plurality of nanometer scale dot-shaped materials comprises metal or metal oxide.

5. The method as claimed in claim 4, wherein the metal comprises copper, silver, gold, aluminum, titanium, zinc, nickel, tin, iron, indium, platinum or palladium.

6. The method as claimed in claim 4, wherein the metal oxide comprises copper oxide, silver oxide, aluminum oxide, titanium oxide, nickel oxide, iron oxide, zinc oxide, tin oxide, indium tin oxide or silicon oxide.

7. The method as claimed in claim 1, wherein the plurality of sub-micrometer scale materials is the nanometer scale carbon tubes and the nanometer scale carbon tubes comprise multi-walled nanometer scale carbon tubes.

8. The method as claimed in claim 1, wherein the plurality of sub-micrometer scale materials is the nanometer scale metal tubes and the nanometer scale metal tubes comprise nanometer scale tubes formed from silver, gold, copper, zinc or aluminum.

9. The method as claimed in claim 1, wherein the plurality of sub-micrometer scale materials is the nanometer scale oxide tubes and the nanometer scale oxide tubes comprise nanometer scale tubes formed from zinc oxide, aluminum oxide, magnesium oxide, beryllium oxide, zirconium oxide, transition metal oxide or multi-metal system oxide.

10. The method as claimed in claim 1, wherein the plurality of nanometer scale dot-shaped materials is non-continuously dispersed on a surface of the plurality of sub-micrometer scale materials before the melting.

11. The method as claimed in claim 1, wherein the plurality of sub-micrometer scale materials comprises a plurality of nanometer scale tubes and the plurality of nanometer scale dot-shaped materials is non-continuously dispersed on a surface of the nanometer scale tubes and between the nanometer scale tubes before the melting.

12. The method as claimed in claim 1, wherein the plurality of nanometer scale dot-shaped materials is melted to connect with or adhere to the plurality of sub-micrometer scale materials.

13. The method as claimed in claim 1, wherein the plurality of nanometer scale dot-shaped materials has a melting point lower than 250° C.

* * * * *